United States Patent [19]

Braunius

[11] Patent Number: 4,884,937
[45] Date of Patent: Dec. 5, 1989

[54] LEAF COLLECTION AND REMOVAL APPARATUS

[76] Inventor: John P. Braunius, 12 Short St., Midland Park, N.J. 07432

[21] Appl. No.: 74,153

[22] Filed: Jul. 16, 1987

[51] Int. Cl.$^4$ .............................................. B60P 1/36
[52] U.S. Cl. .................................... 414/505; 198/518; 414/526; 414/528
[58] Field of Search ............... 414/523, 507, 508, 501, 414/502, 503, 504, 505, 526, 527, 528

[56] References Cited

U.S. PATENT DOCUMENTS

| | | | |
|---|---|---|---|
| 683,833 | 10/1901 | Beck | 198/518 X |
| 2,415,617 | 2/1947 | Werner | 198/518 X |
| 2,481,244 | 9/1949 | Russell | 198/518 |
| 3,769,988 | 11/1973 | Burenga | 414/502 X |
| 3,927,780 | 12/1975 | Dearlove | 414/528 X |
| 3,998,344 | 12/1976 | Pellen | 414/503 |
| 4,149,642 | 4/1979 | Schneider | 414/523 |

FOREIGN PATENT DOCUMENTS

| | | | |
|---|---|---|---|
| 720966 | 5/1942 | Fed. Rep. of Germany | 414/526 |
| 6405892 | 11/1965 | Netherlands | 414/502 |

Primary Examiner—Frank E. Werner
Attorney, Agent, or Firm—Morgan & Finnegan

[57] ABSTRACT

A leaf collector and removal apparatus that may be movably mounted to a refuse compacting vehicle. The apparatus comprises a chute having an inlet end facing forwardly in a position to gather leaves which are fed to a conveyor inside the chute for engaging the leaves received from the inlet end to transporting the leaves to an auger which is in communication with the refuse compactor in the refuse compacting vehicle so that the leaves are transported into the refuse compacting vehicle is filled at which time the apparatus may be moved to the next truck.

2 Claims, 3 Drawing Sheets

LEAF COLLECTION AND REMOVAL APPARATUS

BACKGROUND OF THE INVENTION

This invention relates to leaf collection and removal and more specifically the use of an apparatus which is mobilve and readily adaptable for use with present refuse compacting vehicles.

Present methods employed for leaf removal are extremely costly in equipment and labor. The instant invention will use minimal labor thereby reducing the rapidly rising cost of manual labor. Further, since this invention fully mechanizes leaf collection, the cost of leaf collecting is further reduced.

U.S. Pat. No. 3,927,780 discloses a loading apparatus for a refuse collecting vehicle. This apparatus is provided with an inlet and ramp-like surface for the purpose of permitting easy introduction of refuse into the chute. The rotary drum above the conveyor serves as a feeding device compelling the refuse bags on to a conveyor. At the top of the conveyor, the refuse bags fall into a hopper under the influence of gravity.

U.S. Pat. No. 2,600,028 poses a conveyor comprising of sprocket chains and transverse bar members between said chains. This is a bail-load machine. The bar members have projecting ribs adapted to engage cylindrical bails of hay and force them up inclined surfaces.

U.S. Pat. Nos. 2,676,720 and 4,266,795 disclose detachable material handling equipment, which can be positioned on a truck by means of a hydraulic ram.

SUMMARY OF THE INVENTION

It is the object of this invention to minimize the time and labor in leaf collection by introducing a new and improved leaf collecting apparatus readily attachable to a refuse compacting vehicle.

A means is provided to move the chute on and off the road and also for lifting the leaf collecting apparatus off the refuse compacting vehicle and attach to another one easily and with minimal loss of time and labor.

The apparatus may be transported behind the small truck.

The preferred embodiment of the chute in the leaf collecting apparatus is equipped with guards, a drum conveyor, an auger and guards mounted in the inlet and are placed to protect the mechanism from large objects. The rotating drum has spring teeth mounted to push the leaves through the guards and on to the conveyor belt. The conveyor provides the lifting motion to move the leaves to the auger. The auger then moves the leaves to the refuse compacting vehicle where leaves are compacted.

Other advantages will become apparent from the following specifications taken in connection with the accompanying drawings.

DESCRIPTION OF THE PREFERRED EMBODIMENT

Figure 3:
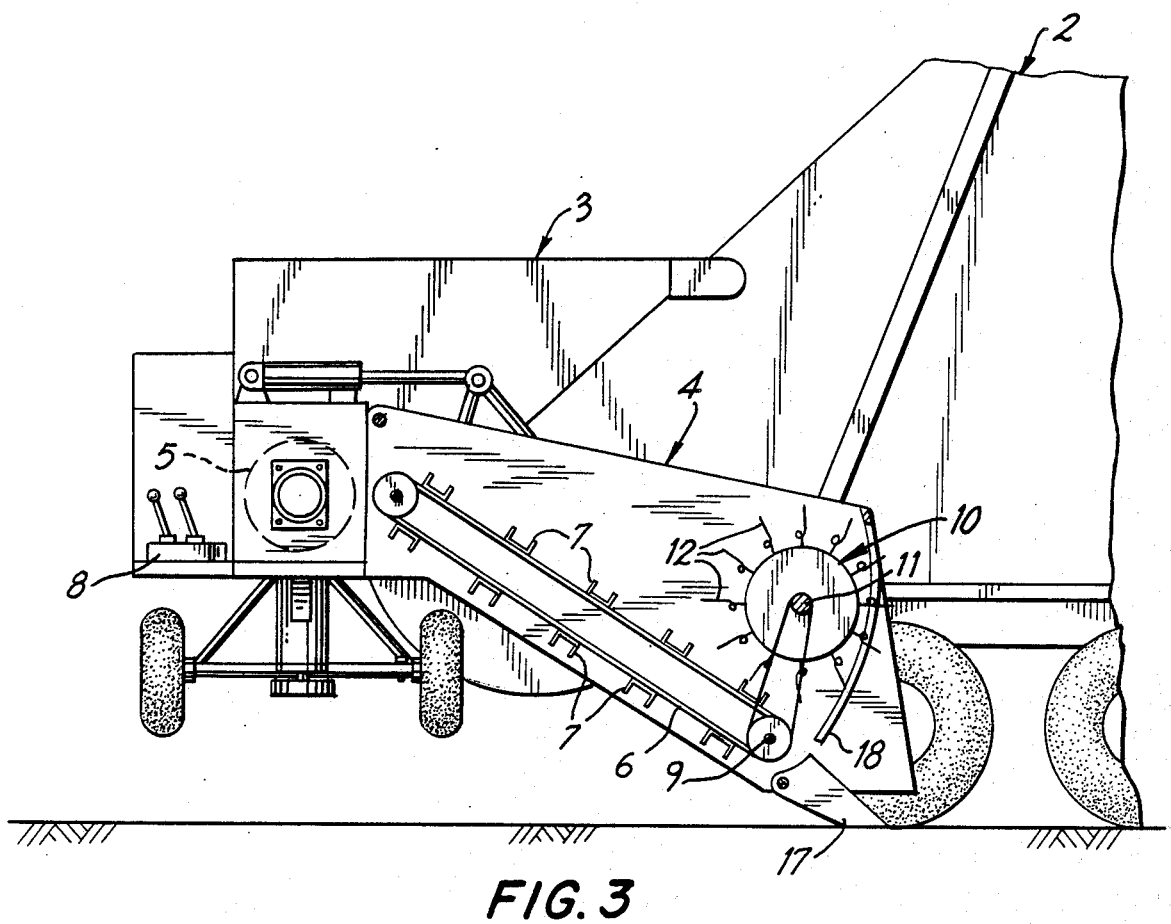
FIG. 3 is a side view of the invention attached to refuse collecting vehicle showing a fragmentary view of the rotary drum, conveyor belt and auger.

The embodiment of the Leaf Collection and Removal Apparatus is illustrated in FIG. 3. It includes a vehicle generally designated (1) which may be any refuse vehicle. The rear end of the vehicle has a refuse receiving cavity (2) into which the leaves are fed.

To the rear of the refuse receiving cavity, is a hopper (3) into which the leaves are fed so they may be moved to the cavity (2).

Figure 1:
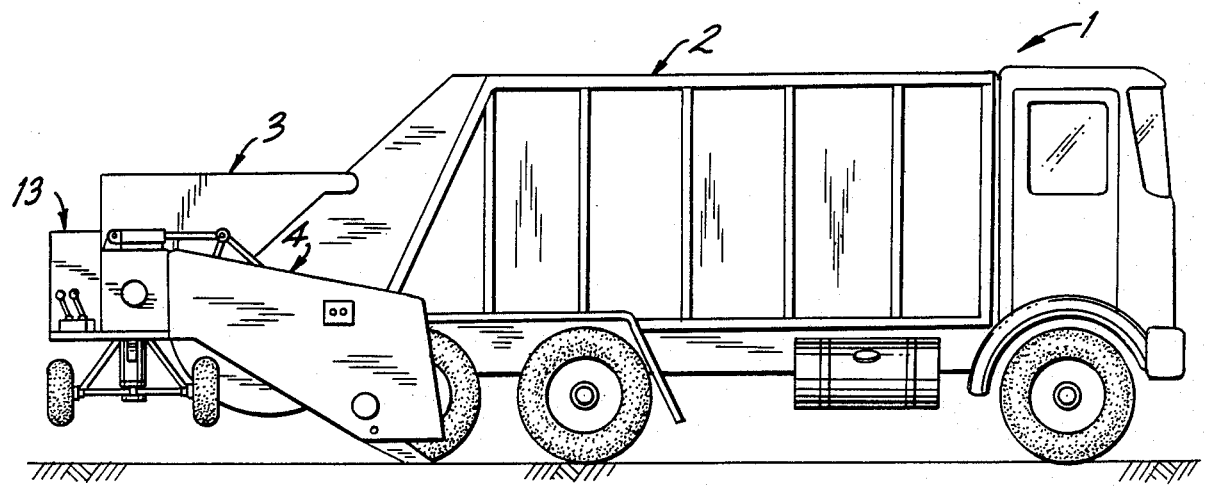
FIG. 1 is a side view of the invention attached to refuse collecting vehicle in the working position.
Figure 2:
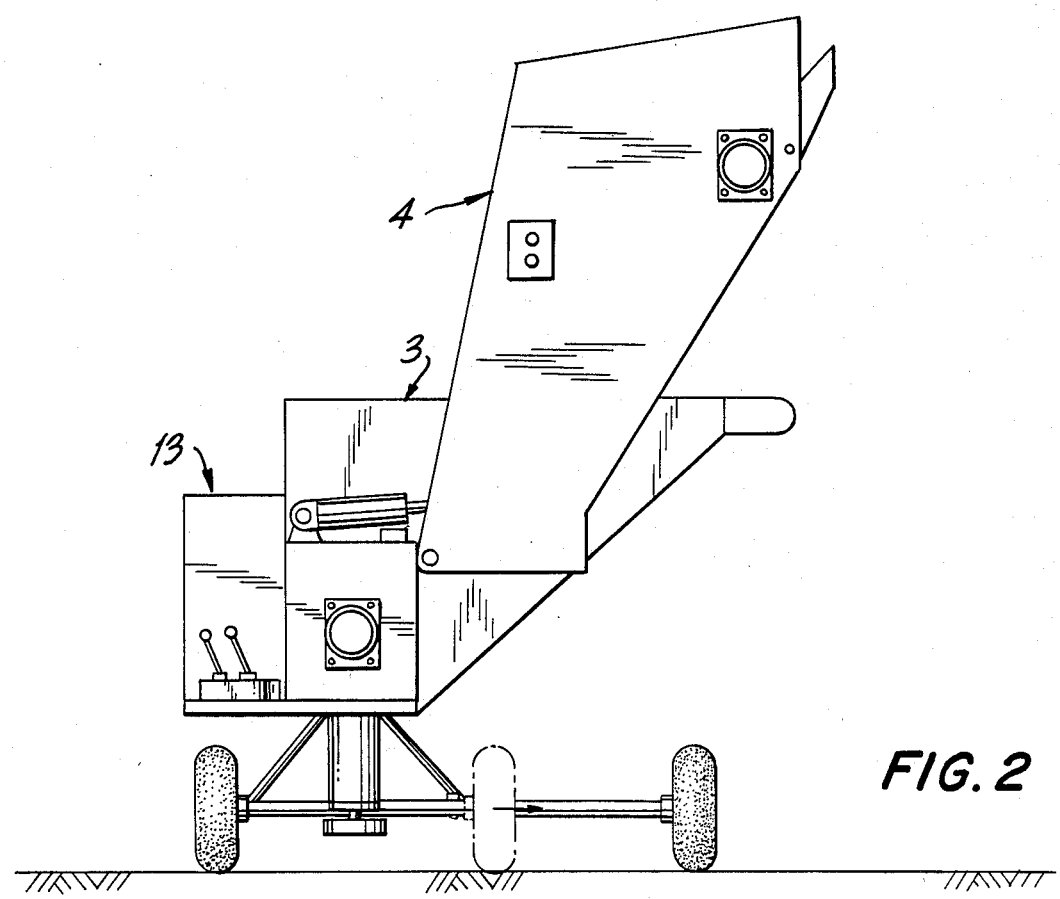
FIG. 2 is a side view of the invention in the transport position.

A hood (4) which may be raised as in FIG. 2 when not in use containing an auger (5) and conveyor belt (6) is forwardly and to the right of the hopper.

The auger (5) acting as a large screw moves the leaves to the hopper (3) from a conveyor belt (6) with ribs (7) used to capture the leaves for movement into the hopper (3) using suitable controls (8).

Forward of the conveyor belt (6) and above the end of the forward portion of the conveyor belt synchronized by a pulley system (9) is a rotary spring drumlike feeding device (10) which is driven on a horizontal shaft (11) which extends transversely to the end of the chute and has springs (12) on its outer surface. The drum (10) is operated to impel leaves to the conveyer (6) which then propels the leaves into the auger (5) moving the leaves to the hopper (3).

The Hood (4) may be selectively raised or lowered by a hydraulic system not detailed (13) comprising an Engine (14) hydraulic pump (15) and Hydraulic tank (16).

At the bottom end of the hood (4) at the inlet end is a retractable blade (17) which may be folded in depending on the road surface.

Just forward the drum (10) and conveyor belt apparatus (6) acting as bars to the inlet end of the ramp are guards (18) which prevent large obstacles from entering the apparatus.

FIG. 2 shows the hood (4) in its raised position when apparatus is not in use and is being transported to other location.

Figure 4:
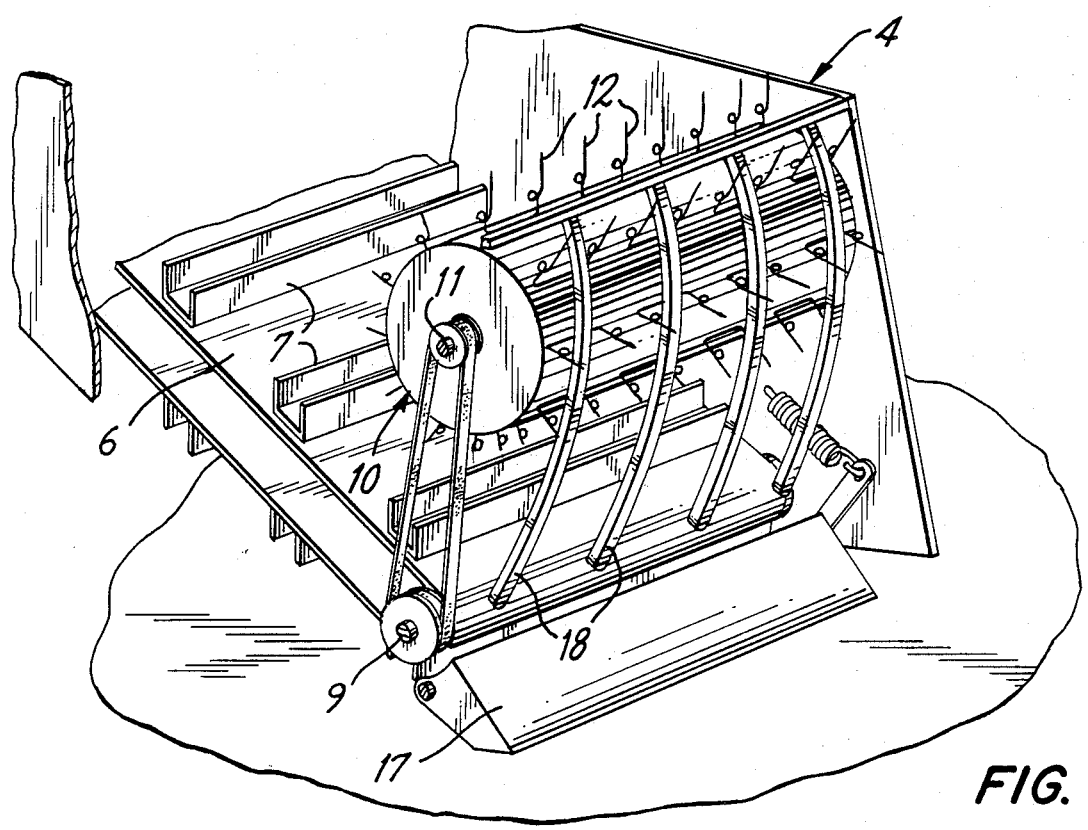
FIG. 4 is an enlarged fragmentary view of the inlet end of the chute and showing the rotary drum conveyor combination and also the protecting guards on the inlet end.

As may be seen from FIGS. 3 and 4, the conveyor surface is provided with a plurality of ribs which serve as a holding means of the leaves. The spring loaded rotary drum (10) acts as a compressing device on leaves entering the inlet end so that the leaves are carried to the auger (5) which by its screwing action compresses and pushes the leaves into the hopper (3) feeding to the refuse cavity (2) of the vehicle.

Figure 5:
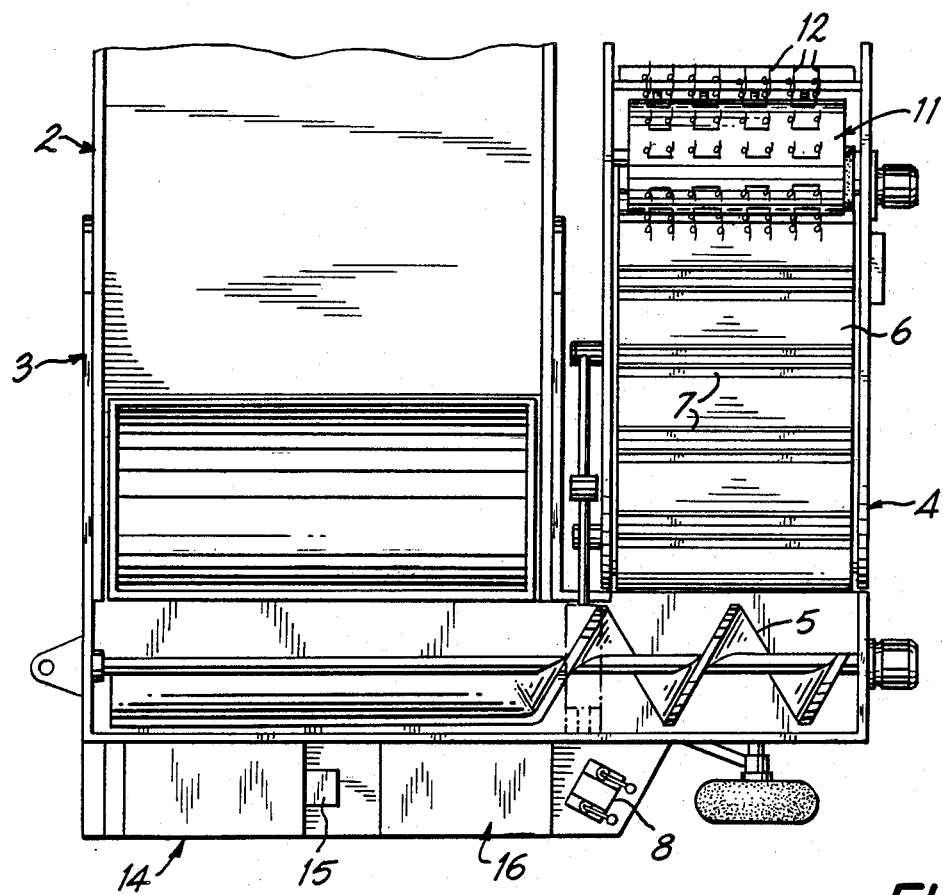
FIG. 5 is a fragmentary top view of the invention attached to a refuse collecting vehicle showing the rotary drum, conveyor belt and auger.
Figure 6:
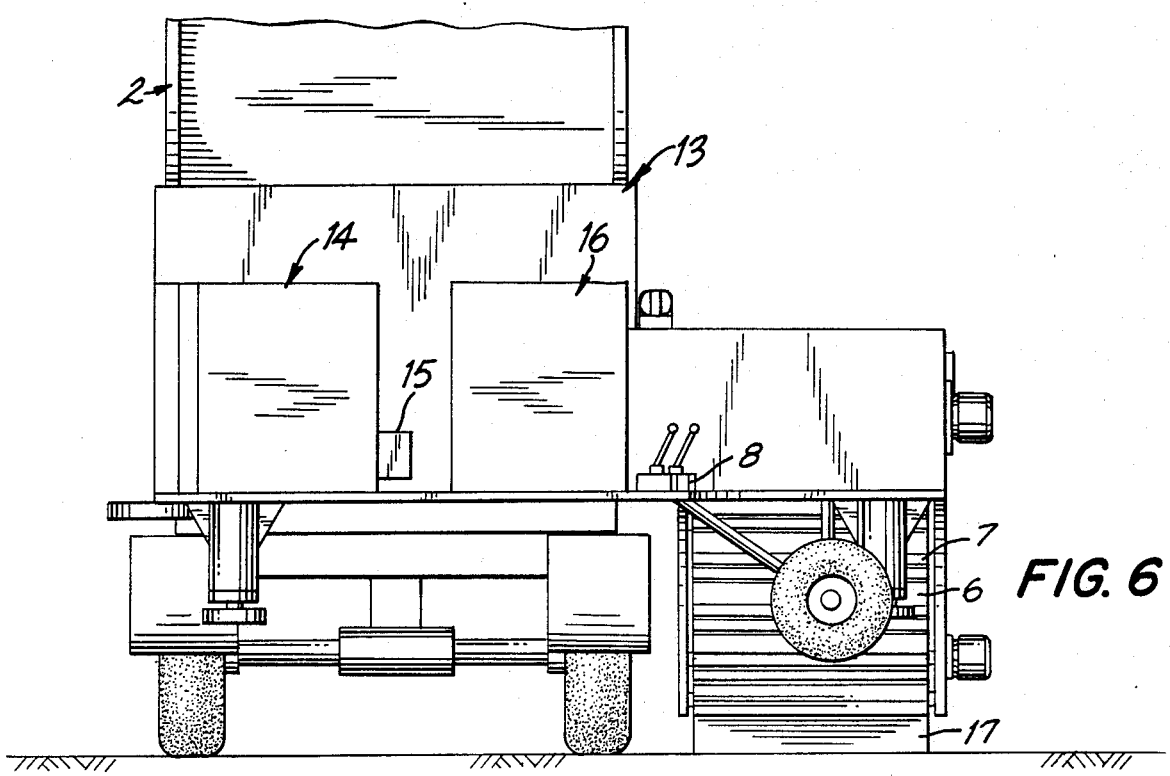
FIG. 6 is a front view of the invention attached to a refuse collecting vehicle.

FIG. 5 shows a top view of the apparatus and gives an overview of the preferred embodiment of the instant invention.

It can be clearly seen from the foregoing that the invention eliminates the need for a labor crew to collect leaves and eliminates any need for the operator to assist in leaf collecting. Further the apparatus is easily attached to existing refuse vehicles eliminating the large cost of specialized equipment.

What I claim is:

1. A leaf collection and removal vehicle adapted to transfer leaves from the ground to a leaf collection compartment above the ground of a second vehicle to which said leaf collection vehicle is adapted to be attached comprising:

a vehicle having a frame, a front inlet end, a means for moving and transporting leaves to the refuse collecting compartment;

a chute means movably mounted on said frame, said chute means having an independent, extendable wheel base for transporting said chute in a path perpendicular to the wheels of a second vehicle when said chute means is detached from said frame said chute means having an inlet into which leaves enter said chute and an outlet communicating with said leaf collection compartment;

said inlet having guard means, said guard means comprising a plurality of vertically disposed, spaced apart, relatively thin bar members adapted to prevent large objects from entering said inlet;

means for moving said frame to and from a position wherein said inlet is in substantial abutment with the underlying ground whereby said inlet end is positioned so as to be adapted to receive leaves resting on the ground;

a rotatable drum extending transversely across said inlet end and connected to said chute, said rotatable drum having helical coil springs to flex and conform to the leaves entering said inlet, said helical coil springs being affixed to the outer surface of said rotatable drum comprising a plurality of rows of spring-like extensions capable of flexing under said drum as leaves are urged and carried from said inlet, said coil springs having a pointed end portion and a coiled body portion;

means for rotating said drum whereby the leaves will be urged into said inlet;

conveyor means on said frame within said chute having a first end and a second end, said first end being adjacent to said inlet and being positioned to receive leaves from said drum;

said conveyor means comprising an endless belt within said chute for receiving leaves from said rotatable drum adjacent to said inlet, said belt having a leaf conveying surface which includes a plurality of spaced apart ribs adapted to hold the leaves in position on said conveyor surface until the conveyor means reaches the second end; and a hood having auger means connected therewith adjacent said second position, said auger being adapted to move the leaves exiting said conveyor means to said refuse collecting compartment.

2. The leaf collection and removal vehicle according to claim 1, wherein said chute inlet comprises means for admitting leaf refuse in a direction parallel but opposite to movement of said second vehicle, and said outlet communicating with said leaf collection compartment comprising means for discharging leaves in the direction of said movement of said second vehicle.

* * * * *